(12) United States Patent
Alewine et al.

(10) Patent No.: US 9,626,166 B1
(45) Date of Patent: Apr. 18, 2017

(54) COMMON SECURE CLOUD APPLIANCE IMAGE AND DEPLOYMENT

(71) Applicant: International Business Machines Corporation, Armonk, NY (US)

(72) Inventors: Neal J. Alewine, Lake Worth, FL (US); Charles W. Cross, Jr., Wellington, FL (US); Shiu-Fun Poon, Cambridge, MA (US); Lubos Ures, Kladno (CZ)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/006,347

(22) Filed: Jan. 26, 2016

(51) Int. Cl.
- G06F 9/44 (2006.01)
- G06F 9/45 (2006.01)
- H04L 29/06 (2006.01)
- H04L 9/08 (2006.01)

(52) U.S. Cl.
CPC ............ G06F 8/41 (2013.01); H04L 9/0816 (2013.01); H04L 63/0428 (2013.01); H04L 63/083 (2013.01)

(58) Field of Classification Search
CPC ......... G06F 8/41; G06F 8/447; G06F 9/45516
USPC ....................................................... 717/140
See application file for complete search history.

(56) References Cited

U.S. PATENT DOCUMENTS

| 7,356,679 | B1 | 4/2008 | Le et al. |
| 9,032,198 | B1 | 5/2015 | Marr et al. |
| 9,098,345 | B2 | 8/2015 | Jones et al. |
| 2009/0217263 | A1 | 8/2009 | Gebhart et al. |
| 2011/0214124 | A1 | 9/2011 | Ferris et al. |
| 2012/0180035 | A1* | 7/2012 | Poddar .............. G06F 17/30247 717/168 |
| 2013/0139150 | A1* | 5/2013 | Illg ........................... G06F 8/63 717/178 |
| 2013/0340028 | A1 | 12/2013 | Rajagopal et al. |
| 2015/0006628 | A1* | 1/2015 | Kruglick ............... G06F 3/0647 709/203 |
| 2016/0104067 | A1* | 4/2016 | Xu ..................... G06F 17/30864 706/46 |

* cited by examiner

Primary Examiner — John Chavis
(74) Attorney, Agent, or Firm — Cantor Colburn LLP; Richard Wilhelm

(57) ABSTRACT

Embodiments include method, systems and computer program products for a common secure cloud appliance image and deployment. In some embodiments, a request for a target node may be received. The appliance image may be obtained in response to receiving the request, wherein the appliance image is a common image that is deployed on different platform types in a cloud management system. The target node may be generated using the appliance image.

9 Claims, 5 Drawing Sheets

COMMON SECURE CLOUD APPLIANCE IMAGE AND DEPLOYMENT

BACKGROUND

The present disclosure relates to methods, systems and computer program products for a common secure cloud appliance image and deployment.

A runtime image or system image is a copy of the entire state of a computer system stored in some non-volatile form such as a file. Runtime images for various platforms differ based on platform type and deployment requirements or methodology. For example, some system image systems may not support different functionalities, which may include but are not limited to mounting of tempfs file systems within a container, mounting a container from a block device, or mounting an encrypted partition within a Docker container. Some systems have a format that can be used to provision bare metal and virtual servers. However, the same format cannot support a container compute node.

SUMMARY

In accordance with an embodiment, a method for dynamic processing of collaborative events is provided. The method may include receiving a request for a target node; obtaining the appliance image in response to receiving the request, wherein the appliance image is a common image that is deployed on different platform types in a cloud management system; and generating the target node using the appliance image.

In another embodiment, a computer program product may comprise a non-transitory storage medium readable by a processing circuit and storing instructions for execution by the processing circuit for performing a method that may include receiving a request for a target node; obtaining the appliance image in response to receiving the request, wherein the appliance image is a common image that is deployed on different platform types in a cloud management system; and generating the target node using the appliance image.

In another embodiment, a system for optimizing persistency using hybrid memory may include a processor in communication with one or more types of memory. The processor may be configured to receive a request for a target node; obtain the appliance image in response to receiving the request, wherein the appliance image is a common image that is deployed on different platform types in a cloud management system; and generate the target node using the appliance image.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for a common secure cloud appliance image and deployment. In some embodiments, a single common image may be constructed such that the image may be deployed on a diverse set of platform types within a cloud management system. These deployment options include physical hardware, virtual machines, and software containers. The common image may also be secured with two-factor encryption for customer specific platform security. An appliance platform image may be designed and constructed so that a single image may be flashed to the boot device of a physical machine, imported as a virtual machine guest by a hypervisor, or executed as a software container on a host operating system. All three of these deployment options are available in cloud management systems. A common image may enable flexibility in design of the cloud management system so that a computing node supported by this type of image may be deployed in any these platform types in response to customer demand and real time load demand.

Figure 1:
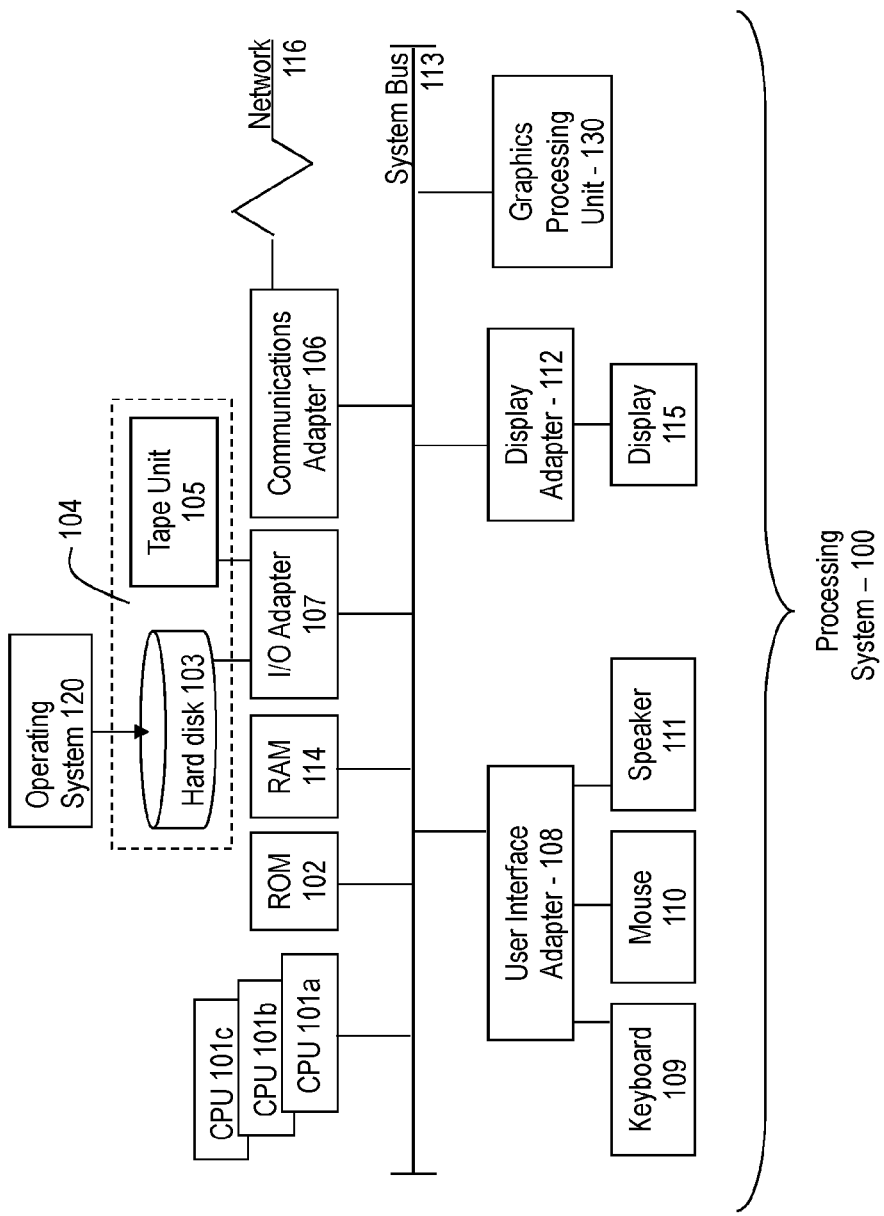
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the Linux® operating system from IBM Corporation to coordinate the functions of the various components shown in FIG. 1.

Figure 2:
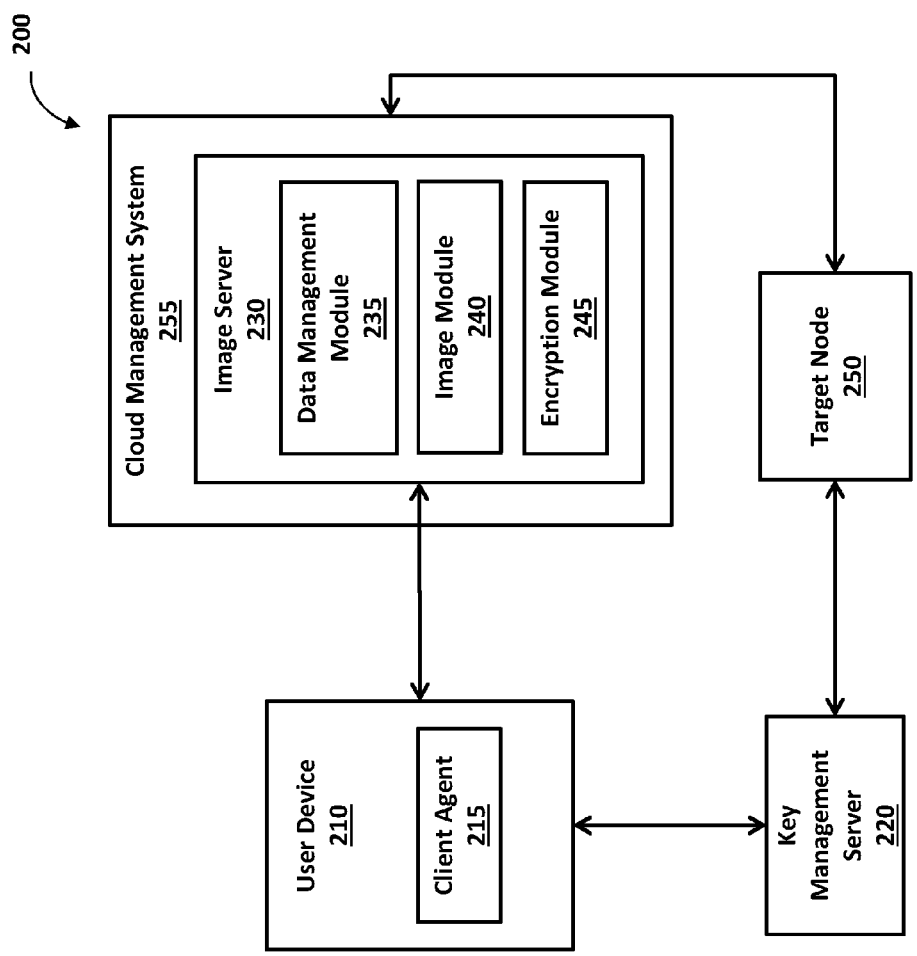
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, a user device 210, a key management server 220, an image server 230, and a target node in a cloud management system.

In some embodiments, the user device 210 may be any type of user device, which may include smartphones, tablets, laptops, desktop, server, and the like. A user device 210 may include a client agent 215. The client agent 215 may include computer-readable instructions that in response to execution by the processor(s) 101 cause operations to be performed including presenting an interface to a user and receiving information from a user. The client agent 215 may receive an indication from a user for an appliance image. In some embodiments, the client agent 215 may generate a request for an appliance image and transmit the request to an image server 230. In some embodiments, the client agent 215 may communicate with a key management server 220 to obtain a universally unique identifier corresponding to a passphrase provided by the user via the client agent 215. In some embodiments, the request to the image server 230 may include the UUID, which may be used to encrypt the requested appliance image prior to transmitting the appliance image to the target node.

In some embodiments, the system may include a key management server 220. The key management server 220 may generate and maintain UUIDs and any associations to passphrases requested by users. In some embodiments, the target node 250 may communicate with the key management server 220 to obtain the passphrase corresponding to the UUID to mount the encrypted partition of the appliance image received from the image server 230. In some embodiments, a customer may store a passphrase associated with an appliance image in a key management server 220 and may receive a unique identifier (UUID) for retrieval by the target node 250 at runtime. Before the image is encrypted for delivery, the UUID for the passphrase may be stored in the image at a known location in the plaintext partition (e.g., /var/lib/img-key-uuid). The program/bin/mnt-encrypted-img may use the UUID at runtime to retrieve the passphrase from the key management server 220 in order to mount the encrypted partition.

In some embodiments, the image server 230 may be any type of computing device, which may include a laptop, desktop, server, and the like. An image server 230 may include a data management module 235, an image module 240, and/or an encryption module 245. In some embodiments, an image server 230 may be implemented as a virtual server in a cloud management system 255. The data management engine 235 may include computer-readable instructions that in response to execution by the processor(s) 101 cause operations to be performed including presenting an interface to a user and receiving information from a user.

The image module 240 may include computer-readable instructions that in response to execution by the processor(s) 101 cause operations to be performed including generating an appliance image. In some embodiments, the image module 240 may retrieve a previously generated appliance image and modify the appliance image in accordance with the request received from a user. In some embodiments, the image module 240 may optimize the appliance image based on a platform type specified by the user. In some embodiments, the image module 240 may communicate with the encryption module 245 to encrypt the encrypted partition of the appliance image.

The encryption module 245 may include computer-readable instructions that in response to execution by the processor(s) 101 cause operations to be performed including encrypting the encrypted partition of an appliance image. In some embodiments, the encryption module 245 may utilize two-factor encryption for the image. In some embodiments, the appliance image may contain an encrypted partition and the appliance image may be encrypted. The encryption module 245 may transmit the appliance image back to the data management module 235. The cloud management system 255 may obtain the appliance image from the image server 230 and may use the appliance image to generate the target node 250. Examples of a target node 250 in a cloud management system may include hardware appliance manufacturing, a bare metal server, a virtual appliance, and/or a container appliance.

Still referring to FIG. 2, the block diagram depicts an example use of an appliance image within a customer fulfillment system that could be implemented with a self-serve image server as part of cloud operations or a traditional product ordering system. In response to a customer order of a particular image type, including a passphrase and UUID from a Key Management Server 220, the image server 230 may deliver an image secured with two-factor encryption using the pass phrase supplied by the customer. This would support delivering an image to a target node 250 of the cloud management system, such as the manufacturing process for production of a physical appliance, delivery of virtual appliances or container images for use on the customer premises, or bare metal servers, virtual appliance servers, or software container appliances within a cloud environment. The appliance image may be secured for operation by the customer who ordered them. In some embodiments, the target platform may be specified by the customer and optimizations of the appliance image may be introduced during image production, for example, leaving the kernel out of images bound to container systems that use the kernel from the host operating system. Since execution of programs within the encrypted image may be preceded by a change root to the mount location, another optimization could be to store the encrypted partition is a separate image in a different location.

Figure 3:
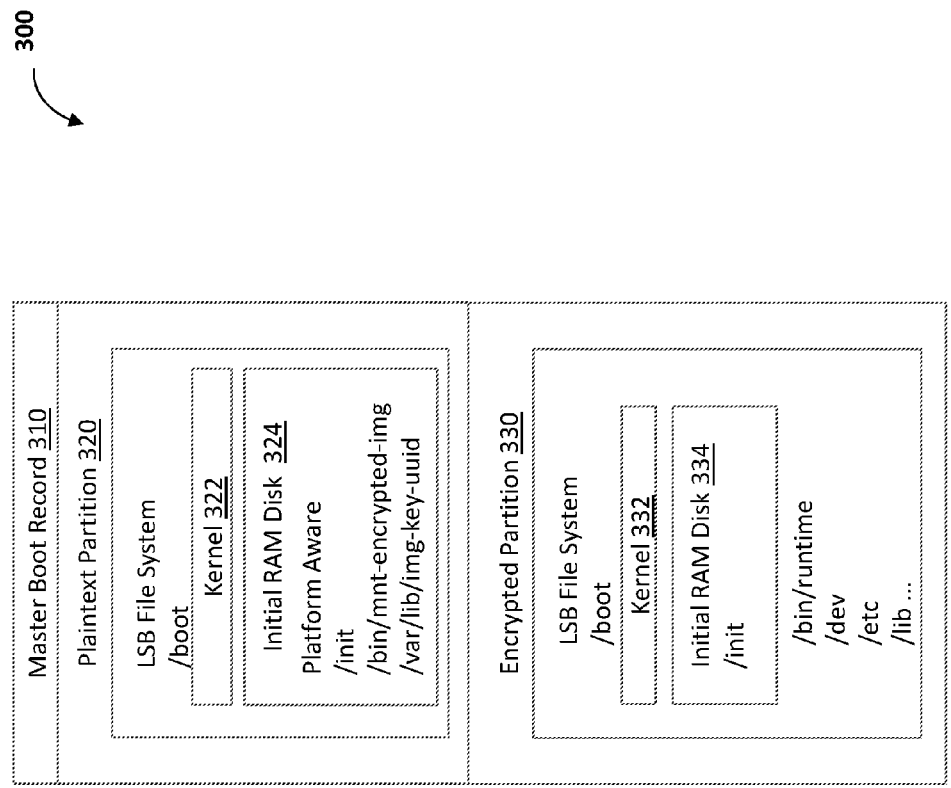
FIG. 3 is a block diagram illustrating a common image architecture in accordance with an exemplary embodiment.

Now referring to FIG. 3, a block diagram illustrating a common image architecture 300 in accordance with an exemplary embodiment is shown. Elements of the common image architecture 300 may have been used in secure appliances to enable a secure boot. In some embodiments, the common image architecture 300 may include a Master Boot Record (MBR) 310 and two partitions. The first partition is a plaintext partition 320 and may boot in the traditional way using the MBR 310. The plaintext partition 320 may contain a kernel 322 and initial RAM disk (initrd) 324. The initrd 324 may contain a "platform aware" initial program (init), which may understand, by querying BIOS and other means, whether it is running on a real machine, on a virtual machine, or in a software container. It may also contain a program mnt-encrypted-image that implements the logic to obtain a key to unlock and mount the second encrypted partition 330, which may contain the appliance runtime and customer data. The program mnt-encrypted-image may use a protocol, such as key management interoperability protocol (KMIP), to obtain the customer key from a key management system to decrypt the encrypted partition 330. KMIP is a communication protocol that defines message formats for the manipulation of cryptographic keys on a key management server. Key may be created on a server and then retrieved, possibly wrapped by other keys.

In some embodiments, the encrypted partition 330 may have been secured with two-factor encryption with a system, such as a disk encryption specification, such as Linux Unified Key Setup (LUKS). Once the encrypted partition 330 is unlocked, the platform aware init program may load the second kernel 332 and use kexec to boot into it. The common image architecture 300 may be flashed or written to the boot device of a computer, imported as the virtual disk of a virtual machine, or mounted as a file system within a software container.

Figure 4:
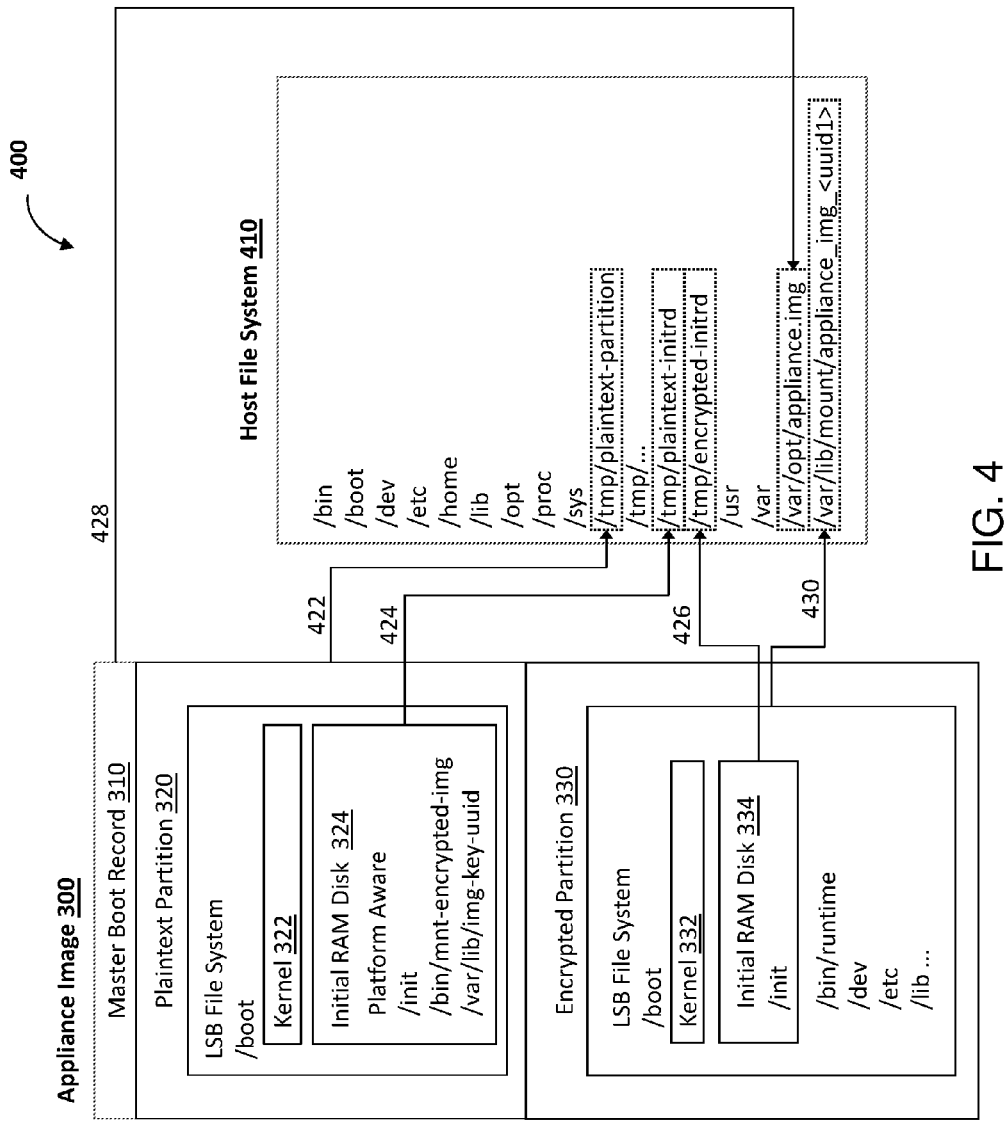
FIG. 4 is a block diagram illustrating an example use case of a common image in a software container in accordance with an exemplary embodiment.

Now referring to FIG. 4, a block diagram illustrating an example use case 400 of a common image in a software container in accordance with an exemplary embodiment is shown. More specifically, FIG. 4 depicts how to use the common image of FIG. 3 in a software container. In one example, the common image 300 may be used from within a software container and may not need rely on the BIOS or Unified Extensible Firmware Interface (UEFI) from a real or virtual machine to execute the boot loader in the MBR 310 to load and run the kernel 322. UEFI is a specification that defines a software interface between an operating system and platform firmware.

A separate script may be supplied to enable the appliance runtime to operate in a software container as a system service. In some embodiments, data exchange 428, the image file 300 may be installed into the container host file system 410 at /var/opt/appliance.img. The separate system service script may use kpartx to create device maps for the disk partitions contained in the image file 300. At data exchange 422, from the image file on the host system, the plaintext partition 320 is mounted in the container host file system 310 at tmp/plaintext-partition.

At data exchange 424, the initial ram disk image 324 may be loop mounted from the mounted plaintext partition in the container host file system 410 at tmp/plaintext-initrd. At data exchange 430, from the mounted plaintext initial ram disk, the program or script/bin/mnt-encrypted-img may be executed, which may loop mount the encrypted partition 330 with LUKS cryptsetup at /var/lib/mount/appliance_img_<uuid1>.

At data exchange 426, the script/bin/mnt-encrypted-img may loop mount the initial ram disk 334 from the encrypted partition 330 into the host rfile system 410 at tmp/encrypted-initrd. The host container system may execute the program /init from the mounted initial ram disk 330. The /init script changes root to the encrypted partition and executes the programs within the encrypted partition that comprise the appliance runtime.

Figure 5:
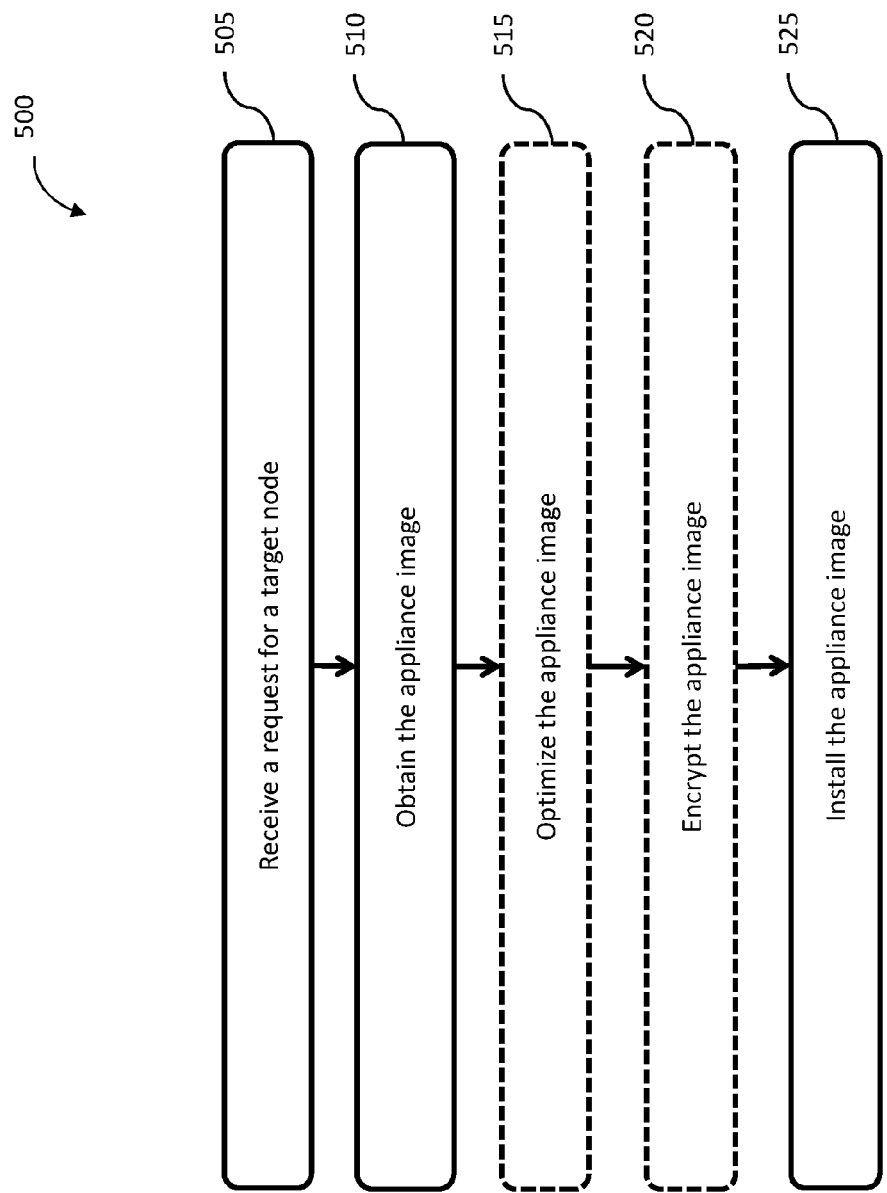
FIG. 5 is a flow diagram of a method for deployment of a common image in accordance with an exemplary embodiment.

Now referring to FIG. 5, a flow diagram of a method 500 for dynamic processing for collaborative events in accordance with an exemplary embodiment is shown.

At block 505, an image server 230 may receive a request for a target node 250. The request may include a type of target node 250, such as a bare metal server, a virtual server, or a software container. The cloud management system 255 may create the target node 250 using the image obtained from the image server 230, as described below.

In some embodiments, a data management module 235 of the image server 230 may receive a request for transmission of an appliance image 300 to use to generate a target node 250 by the cloud management system 255. The request may be received from a client agent 215 of a user device 210. In some embodiments, the request may contain additional information, such as a platform specification associated with the target node 250 or a UUID to be used to encrypt the requested appliance image 300.

At block 510, the cloud management system 255 may obtain an appliance image 300 from the image server 230. In some embodiments, the image module 240 of the image server 230 may generate an appliance image 300. In some embodiments, the appliance image 300 may be a common image that is deployed on different platform types in a cloud management system. The appliance image 300 may include a plaintext partition and an encrypted partition.

In some embodiments, the image server 230 may receive a request to generate a target node 250. The request may include an indication of a program to include in the target node 250. The image module 240 may compile the requested program in response receiving the request. The image module 240 may create the appliance image with a file system and copy the compiled program into the file system. The image module 240 may unmount the appliance image 300 and store the image as a file. In some embodiments, the appliance image 300 may be stored in a cloud repository. The appliance image 300 may be used to generate the target node 250.

In some embodiments, the image module 240 may retrieve a previously generate appliance image 300 from a cloud repository in response to receiving the request for an appliance image 300.

In some embodiments, the image module 240 may store a UUID in a location in the plaintext partition 320. The UUID may be retrieved by the target node 250 and used to decrypt the encrypted partition 330.

At optional block 515, the image server 230 may optimize the appliance image 300. In some embodiments, the image module 240 may generate an appliance image 300 in response to the request received at block 505. If the request included an indication of a platform associated with the target node 250, the image module 240 may optimize the appliance image 300 during production by leaving a kernel out of the images bound to container systems that execute from the kernel of the host operating system. In some embodiments, the image module 240 may optimize the appliance image 300 during production by storing the encrypted partition 330 of the appliance image 300 as a separate image in a different location.

At optional block 520, the image server 230 may encrypt the appliance image 300. In some embodiments, the encryption module 245 may receive a UUID in the request from the user device 210. The UUID may have been generated or obtained from the key management server 220 and may correspond to a passphrase provided to the key management server 220 by the user device 210. The encryption module 245 may encrypt the appliance image 300. Before encrypting the image, the UUID corresponding to the passphrase may be stored on the appliance image 300 in the plaintext partition 320. The UUID may be retrieved at runtime by the target node 250 to retrieve the passphrase from the key management server 220 in order to mount the encrypted partition 330.

At block 525, the cloud management system 255 may obtain the appliance image 300 from the image server 230 and create a target node 250 using the appliance image 300.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving a request for a target node, wherein the request comprises an indication of a platform associated with the target node;
obtaining an appliance image in response to receiving the request, wherein the appliance image is a common image that is deployed on different platform types in a cloud management system and comprises a plaintext partition and an encrypted partition;
generating the target node using the appliance image;
optimizing the appliance image during production by leaving a first kernel out of images bound to container systems that use a second kernel of a host operating system;
optimizing the appliance image during production by storing an encrypted portion of the appliance image as a separate image in a different location;
encrypting the appliance image using a unique universal identifier (UUID), wherein the UUID corresponds to a passphrase provided to a key management system by a user;
storing the UUID in a location in the plaintext partition, wherein the UUID is retrieved by the target node and used to decrypt the encrypted partition.

2. The computer-implemented method of claim 1, wherein the appliance image is obtained from a cloud repository.

3. The computer-implemented method of claim 1, further comprising:
receiving a second request to generate a second target node, wherein the second request comprises an indication of a program to include in the second target node;
compiling the program in response receiving the second request;
creating the appliance image with a file system;
copying the compiled program into the file system;
unmounting the created appliance image; and
generating the second target node using the appliance image.

4. A computer program product comprising a non-transitory storage medium readable by a processing circuit and storing instructions for execution by the processing circuit for performing a method comprising:
receiving a request for a target node, wherein the request comprises an indication of a platform associated with the target node;
obtaining an appliance image in response to receiving the request, wherein the appliance image is a common image that is deployed on different platform types in a cloud management system and comprises a plaintext partition and an encrypted partition;
generating the target node using the appliance image;
optimizing the appliance image during production by leaving a first kernel out of images bound to container systems that use a second kernel of a host operating system;
optimizing the appliance image during production by storing an encrypted portion of the appliance image as a separate image in a different location;
encrypting the appliance image using a unique universal identifier (UUID), wherein the UUID corresponds to a passphrase provided to a key management system by a user;
storing the UUID in a location in the plaintext partition, wherein the UUID is retrieved by the target node and used to decrypt the encrypted partition.

5. The computer program product of claim 4, wherein the appliance image is obtained from a cloud repository.

6. The computer program product of claim 4, wherein the method further comprises:
receiving a second request to generate a second target node, wherein the request comprises an indication of a program to include in the target node;
compiling the program in response receiving the second request;
creating the appliance image with a file system;
copying the compiled program into the file system;
unmounting the created appliance image; and
generating the second target node using the appliance image.

7. A system, comprising:
a processor in communication with one or more types of memory, the processor configured to:
receive a request for a target node, wherein the request comprises an indication of a platform associated with the target node;
obtain an appliance image in response to receiving the request, wherein the appliance image is a common image that is deployed on different platform types in a cloud management system and comprises a plaintext partition and an encrypted partition;
generate the target node using the appliance image;
optimize the appliance image during production by leaving a first kernel out of the images bound to container systems that use a second kernel of a host operating system;
optimize the appliance image during production by storing an encrypted portion of the appliance image as a separate image in a different location;
encrypt the appliance image using a unique universal identifier (UUID), wherein the UUID corresponds to a passphrase provided to a key management system by a user;
store the UUID in a location in the plaintext partition, wherein the UUID is retrieved by the target node and used to decrypt the encrypted partition.

8. The system of claim 7, wherein the appliance image is obtained from a cloud repository.

9. The system of claim 7, wherein the processor is further configured to:
receive a second request to generate a second target node, wherein the request comprises an indication of a program to include in the second target node;
compile the program in response receiving the second request;
create the appliance image with a file system;
copy the compiled program into the file system;
unmount the created appliance image; and
generate the second target node using the appliance image.

* * * * *